Feb. 2, 1926.
W. E. ERICSON
AUTOMOBILE BUMPER
Filed Oct. 31, 1924
1,571,249
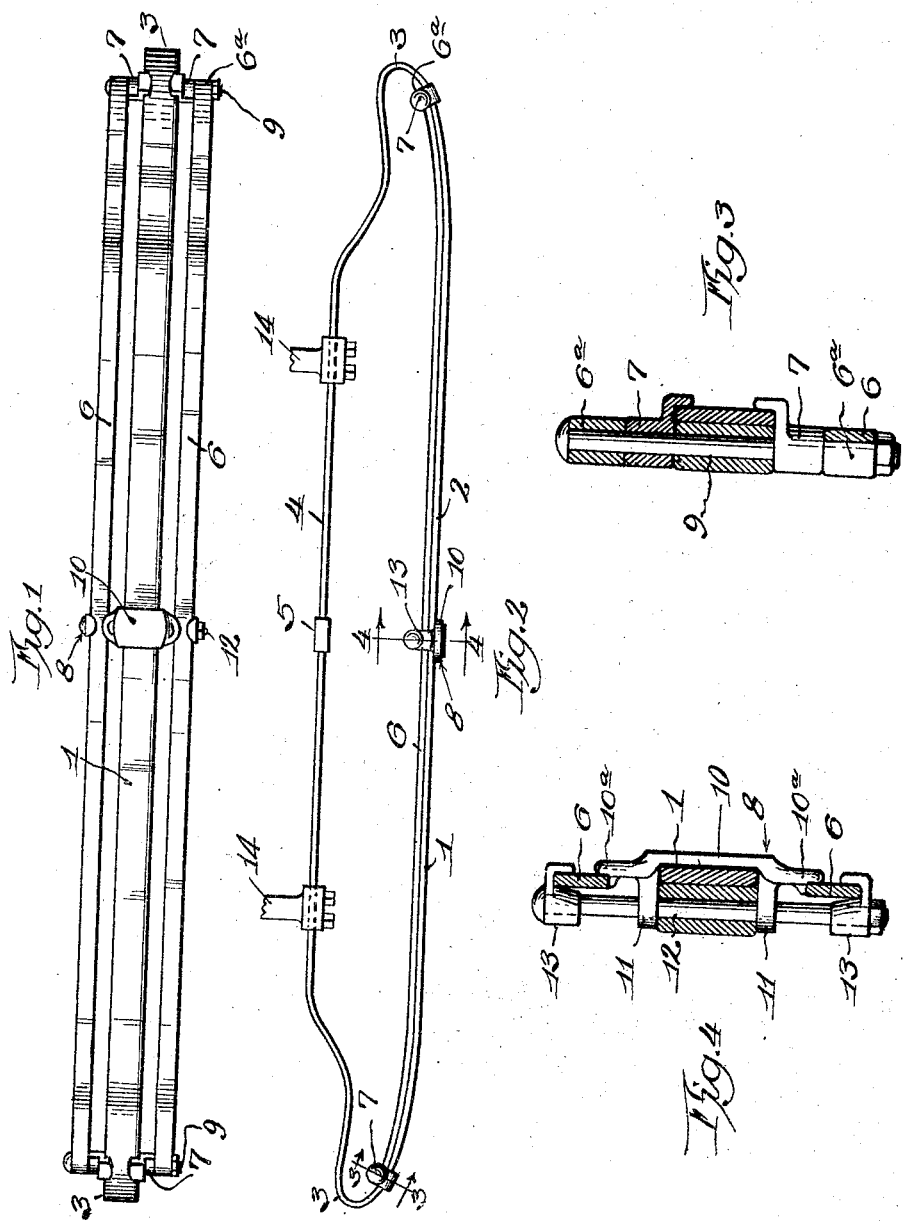

Patented Feb. 2, 1926.

1,571,249

UNITED STATES PATENT OFFICE.

WILLARD E. ERICSON, OF EVANSTON, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed October 31, 1924. Serial No. 746,970.

*To all whom it may concern:*

Be it known that I, WILLARD E. ERICSON, a citizen of the United States of America, and a resident of Evanston, Illinois, have invented a certain new and useful Improvement in Automobile Bumpers, of which the following is a specification.

This invention relates to improvements in automobile bumpers, and more particularly to bumpers of the resilient bar type consisting of two or more parallel spring bars spaced apart vertically and secured to the automobile frame by suitable attaching brackets.

The style of bumper herein disclosed and having the general characteristics above set forth, is further characterized by certain improved features of construction and design whereby adequate protection against collision may be afforded without undue massiveness of structure or cumbersomeness in design and appearance.

The principle of construction followed is that of providing a relatively stout bar shaped in the form of an elongated flattened loop, to which are attached above and below, lighter auxiliary bars extending throughout the forward or impact portion of the main bar and offset slightly to the rear thereof thus affording additional protective area and resistance to the force of collision impacts.

A preferred embodiment of the invention is disclosed in the accompanying drawings, in which—

Figure 1 is a view in front elevation of the bumper.

Figure 2 is a top plan view of the bumper.

Figure 3 is an enlarged detail view in section taken on line 3—3 of Fig. 2, and

Figure 4 is an enlarged sectional view taken on line 4—4 of Fig. 2.

As clearly shown in Figs. 1 and 2, the bumper consists of a single flat bar 1 of spring steel, bent or shaped to provide a forward impact member 2, looped or U-shaped end portions 3, 3 and a rear portion 4 formed by extending the ends of the bar beyond the U-shaped ends and joining them together by means of a clamp 5, midway between the ends. To the forward or impact portion of the main bar are mounted two relatively narrow auxiliary bars 6, 6 preferably of a somewhat lighter stock, which extend longitudinally between the ends 3, 3 of the main bar and in parallel and vertically spaced relation above and below the same. These bars are secured at their ends to the main bar 1 just short of the extremities of the bumper, by means of clamping members 7, 7 and at their central points by a clamping member 8.

The clamping members 7, 7 are loosely mounted on vertical pins 9, 9 which are offset to the rear of the main bar 1, and pass through eyes $6^a$, $6^a$ formed at each end of the bar 6, 6. There are two clamping members on each pin which engage the opposite edges of the main bar by means of fingers, so that on drawing up on the pins by means of a nut on one end of the pin, the pins are secured to the main bar and in turn support the ends of the bars 6, 6. A somewhat similar clamping member connects the central portion of the bars. A clamping plate 10 passes crosswise of the front face of the main bar with tongues $10^a$, $10^a$ at each end which overlap the adjacent edges of the auxiliary bars (Fig. 4). Integral with the plate 10 are rearwardly projecting lugs 11, 11 which pass between the bars. A pin 12 extends through holes in these lugs, and carries two clamping members 13, which engage the extreme edges of the auxiliary bars 6, 6. A nut is provided at one end of the pin for drawing the parts together.

A bumper thus constructed includes the single main bar which resists and absorbs the larger portion of the impact, and has direct connection with the vehicle by means of attaching brackets or hangers 14, 14, the auxiliary bars being supported upon the main bar serving principally to give added transverse width to the impact or bumper face without adding materially to the weight of the bumper or complicating its construction. In short, it affords ample protection, without the appearance of massiveness, due to the lighter construction of the auxiliary bars and the utilization of the main bar as supports therefor.

I claim as my invention:

1. A bumper comprising a main impact member consisting of a single bar bent in the form of a flat loop and adapted to be attached to the vehicle frame, and a pair of relatively light auxiliary bars extending above and below the forward portion of said main bar and clamping members at the ends of said auxiliary bars, and engaging said main bar adjacent the ends of said forward portion.

2. A bumper comprising a main impact member consisting of a single bar bent in the form of a flat loop and adapted to be attached to the vehicle frame, and a pair of relatively light auxiliary bars extending in parallel and vertically spaced relation substantially throughout the forward portion of said main bar, clamping members consisting of pins extending through eyes in the ends of said auxiliary bars, and clamping fingers on said pins and embracing said main bar.

3. A bumper comprising a main impact member consisting of a single bar bent in the form of a flat loop, and adapted to be attached to the vehicle frame, auxiliary bars extending in parallel and vertically spaced relation above and below said main bar throughout the forward portion thereof, and clamping members connecting the ends of said auxiliary bars and secured in turn to said main bars.

Signed at Waukegan, this 28th day of October, 1924.

WILLARD E. ERICSON.